United States Patent

Ishibashi et al.

[11] Patent Number: 5,766,438
[45] Date of Patent: Jun. 16, 1998

[54] ELECTROLYZER AND A METHOD OF OPERATING THE SAME

[75] Inventors: Tadaya Ishibashi, Suita; Masanori Sasaki, Okazaki; Hideto Obara; Hiroshi Kano, both of Uji, all of Japan

[73] Assignee: Unitika, Ltd., Hyogo, Japan

[21] Appl. No.: 801,557

[22] Filed: Feb. 18, 1997

Related U.S. Application Data

[60] Continuation of Ser. No. 477,416, Jun. 7, 1995, abandoned, which is a division of Ser. No. 202,703, Feb. 24, 1994, Pat. No. 5,458,762, which is a continuation of Ser. No. 811,612, Dec. 23, 1991, abandoned.

[30] Foreign Application Priority Data

Dec. 26, 1990 [JP] Japan ..................... 2-406447
Apr. 2, 1991 [JP] Japan ..................... 3-68648

[51] Int. Cl.[6] .............. B01D 61/42; C25D 7/00; C25B 7/00; C25F 7/00
[52] U.S. Cl. .............. 204/520; 204/522; 204/525; 204/528; 204/531; 204/627; 204/630; 204/633; 204/640
[58] Field of Search ........................ 204/520, 522, 204/525, 528, 581, 627, 630, 633, 640

[56] References Cited

U.S. PATENT DOCUMENTS

| | | | |
|---|---|---|---|
| 2,593,915 | 4/1952 | Pavelka | 204/640 |
| 2,739,938 | 3/1956 | Wiechers | 204/640 |
| 3,099,615 | 7/1963 | Kollsman | 204/520 |
| 3,165,460 | 1/1965 | Zang et al. | 204/634 |
| 3,341,441 | 9/1967 | Giuffrida et al. | 204/525 |
| 3,697,410 | 10/1972 | Johnson et al. | 204/633 |
| 3,764,499 | 10/1973 | Okubo et al. | 205/746 X |
| 3,920,534 | 11/1975 | Jensen et al. | 204/282 |
| 4,087,337 | 5/1978 | Bennett | 205/342 |
| 4,105,534 | 8/1978 | Beatty, III | 204/630 |
| 4,115,225 | 9/1978 | Parsi | 204/525 |
| 4,323,435 | 4/1982 | Carlin | 205/342 |
| 4,578,160 | 3/1986 | Asano et al. | 205/342 |
| 4,654,137 | 3/1987 | Vaughan | 204/630 |
| 4,810,344 | 3/1989 | Okazaki | 204/228 |
| 4,964,970 | 10/1990 | O'Hare | 204/632 |
| 5,026,465 | 6/1991 | Katz et al. | 204/528 |

FOREIGN PATENT DOCUMENTS

| | | |
|---|---|---|
| A-0 202 002 | 11/1986 | European Pat. Off. |
| 63-051990 | 3/1988 | Japan |
| A-63-51990 | 3/1988 | Japan |
| A-63-519920 | 3/1988 | Japan |

OTHER PUBLICATIONS

European Search Report, Form 1503 03.82 (P04CO1) dated May 25, 1992.

*Primary Examiner*—Arun S. Phasge
*Assistant Examiner*—John S. Starsiak, Jr.
*Attorney, Agent, or Firm*—Barnes, Kisselle, Raisch, Choate, Whittemore & Hulbert, P.C.

[57] ABSTRACT

In an electrolyzer provided according to this invention, the polarity of electrodes is periodically inverted at very short intervals. This has the effect of allowing gases to be generated uniformly all over the surface of each electrode in the form of extremely small bubbles instead of being formed in specific positions in the form of large bubbles as is the case with a conventional electrolyzer in which a direct current is allowed to flow without changing the flow direction. Thus the surfaces of electrodes are prevented from being covered with bubbles, and the flow of liquids along the surfaces of electrodes is not disturbed by the bubbles any more.

9 Claims, 7 Drawing Sheets

ELECTROLYZER AND A METHOD OF OPERATING THE SAME

REFERENCE TO CO-PENDING APPLICATION

This is a continuation application of parent U.S. patent application Ser. No. 08/477,416 filed Jun. 7, 1995, now abandoned, which is a divisional application of grandparent Ser. No. 08/202,703 filed Feb. 24, 1994, which issued on Oct. 17, 1995 as U.S. Pat. No. 5,458,762, which is a continuation of U.S. patent application Ser. No. 07/811,612 filed Dec. 23, 1991 and now abandoned.

FIELD OF THE INVENTION

The present invention relates to an electrolyzer and a method of operating the same, and in particular the invention concerns itself with an electrolyzer of the kind provided with ion exchange membranes for treating a liquid which contains metal ions, typical of such a liquid being the one used for the surface treatment of metal.

BACKGROUND OF THE INVENTION

It is known to immerse two plate-shaped electrodes in an electrolyte and allow them to face each other therein. It is also known, as described in the Japanese Laid Open Patent Applications Nos. 61-241592 and 61-276986, to immerse a cylindrical outer electrode and a cylindrical inner electrode in an electrolyte contained in a likewise cylindrical electrolyzer.

Either of these two types of electrolyzers has disadvantages that, since electric charge to be carried by an anode is not distributed uniformly on the surface of the anode, the anode is locally overheated to such an extent that a protective coat applied to the inner surface of the anode may possibly fall off, that it is difficult to allow high-intensity operation to last for many hours, that a thick cable is required for supplying the electrolyzer with high current, and that it is difficult to reduce electrolytic voltage by bringing the electrodes close together.

It is a matter of common knowledge that not all electrolytic current is consumed for dissociating an electrolyte, but a considerable portion of the electrolytic current is consumed for the electrolysis of water in which the electrolyte is dissolved. Gases are generated as a result of the electrolysis of water and take the form of bubbles with which the surfaces of electrodes are covered. There are some cases where insulation resistance caused thereby is such that an electric current is kept from flowing.

Furthermore, it is common to allow a direct current to flow without changing the flow direction and hence without inverting the polarity of electrodes.

When the inflated bubbles burst, the electrodes undergo a great impact. Particulate metallic oxides are formed and stick to the surfaces of the electrodes. Especially the electrodes having protective coats are affected adversely thereby. In order to cope with this adverse effect, charging current density must be kept under strict control.

The problem is how to reconcile the durability of electrodes and the highest electrolytic current for obtaining the highest current density allowable for the electrodes.

It is also a matter of common knowledge that pickling liquor in a pickling device contains various kinds of metal ions. When such pickling liquor is subjected to electrolysis, as compared with the case where a liquid having a simpler chemical composition is subjected to electrolysis, there is a large difference in the chemical composition of a liquid obtained at the delivery side of an electrolyzer. Although, according to a common belief, it is supposedly possible to isolate the metal ions almost completely if one uses a highly selective ion exchange membrane, the reality is quite different from what is commonly believed.

SUMMARY OF THE INVENTION

It is an object of the present invention to provide an electrolyzer having a durable anode. It is another object of the present invention to provide an electrolyzer of simplified coustruction for ease and economy of manufacture. It is still another object of the present invention to provide an electrolyzer in which charging current density can be made more uniform. It is yet still another object of the present invention to provide an electrolyzer having a cylindrical outer electrode as an anode and a cylindrical inner electrode as a cathode so that a liquid may be allowed to uniformly come in contact with the surface of each electrode. Careful consideration has been given to the manner in which ion exchange membranes are interposed between these two electrodes and liquids are fed to the gaps. Simplified construction for ease and economy of manufacture can be effectuated by designing the electrodes such that incidental facilities are attached to the upper and lower ends of the electrodes.

In an electrolyzer provided according to this invention, the polarity of electrodes is periodically inverted at very short intervals. This has the effect of allowing gases to be generated uniformly all over the surface of each electrode in the form of extremely small bubbles instead of being formed in specific positions in the form of large bubbles as is the case with a conventional electrolyzer in which a direct current is allowed to flow without changing the flow direction. Thus the surfaces of electrodes are prevented from being covered with bubbles, and the flow of liquids along the surfaces of electrodes is not disturbed by the bubbles any more.

Some kinds of pickling liquor contain halides among other things, together with metal ions which are liable to be subjected to coordination bond with the halides. The present inventors have found that, when one of these kinds of pickling liquor is fed to the electrolytic solution compartment of an electrolyzer, metal ions subjected to electrophoresis to the catholyte compartment are accompanied by halogen ions such that the equivalent ratio of metal ions to halogen ions falls within the range between 1:0.4 and 1:0.6 in terms of electrochemical equivalents.

One cannot sharply decrease the concentration of halogen ions in the catholyte compartment merely by employing a special kind of cation permeable membrane, althouth a slight change in the equivalent ratio of metal ions to halogen ions may be brought about thereby.

Another trouble is that the solubility of sodium fluoride is not so high. The amount of sodium fluoride in the catholyte compartment exceeds its solubility in a short time, and the sodium fluoride in excess of its solubility accumulates in the catholyte compartment in the form of a precipitate.

In order to permit the continuous operation of an electrolyzer, the accumulating precipitate must be continuously removed from the catholyte compartment.

Still another trouble is that pickling liquor in a pickling device decreases in quantity when the pickling operation is kept running for many hours. This is because, every time steel by way of example is immersed in the pickling liquor and then taken out therefrom, a small quantity of the pickling liquor sticking to the surfaces of the steel is also taken out from the pickling device. As a consequence, rinsing water used for rinsing the surfaces of the steel subsequently to the immersion of the steel in the pickling liquor contains some components which it is desirable to recover and refeed to the pickling device. On the other hand, it is also desirable to isolate metal ions from the rinsing water after converting them into insoluble matters. If lime is used for the purpose of isolating iron, a halide in coordination bond with iron is also isolated from the rinsing water. This halide must be isolated from the metallic components so that the latter may be recycled.

In order to permit an electrolyzer to be run at low electrolytic voltage, electrodes must be brought close together and a liquid must be allowed to uniformly come in contact with the surface of each electrode. These requirements will be advantageously fulfilled if the electrolyzer is provided with cylindrical electrodes disposed in concentric relation. Simplified construction for ease and economy of manufacture can be effectuated by designing the electrodes such that incidental facilities are attached to the upper and lower ends of the electrodes.

In accordance with the present invention, a cylindrical anode provided outside and in concentric spaced relation to inner cylindrical elements is used as an outer vessel exposed to the ambient air so as to be air-cooled. A plurality of terminals connect a source of direct current with the outer surface of the cylindrical anode so that electric charge to be carried by the anode may be dispersed as uniformly as possible on the surface of the anode. Thus the anode cannot possibly be locally overheated to such an extent that an overcoat applied to the inner surface of the anode falls off. This preclusion of the anode from overheat serves to extend the life-time of the anode.

In accordance with the present invention, the cathode is also cylindrical and disposed close to the anode. Small holes are uniformly distributed all over the surfaces of the cathode, with the rate of hole area not exceeding 40%. Because of these holes, bubbles formed on the surfaces of the cathode can easily part therefrom. A plurality of conductive bars connect the above-described source of direct current with the inner surface of the cylindrical cathode so that they, together with the above-described terminals, may be allowed to serve for making the charging current density more uniform. The cathode has a smooth inner surface so as to permit the same to be in a contoured tight engagement with the conductive bars and so as to permit the conductive bars to be withdrawn by an upward movement.

The electrodes are arranged on a support structure. Equipment associated with the electrolyzer feeds the liquids to, and discharges them from, the respective compartments.

In order that the catholyte may be uniformly discharged from the catholyte compartment, a circular ridge is provided at the upper end of the catholyte compartment. Each liquid flows uniformly omnidirectionally towards the outer edge of a flange provided at the discharge side of each compartment and then gravitationally spills therefrom. Since gases are generated on the surfaces of the electrodes as mentioned above, separation of the gases from the liquids is accomplished by providing separate discharge ports for the gases and the liquids.

In accordance with the present invention, direct current from the power supply may take the form of various pulses including triangular pulses. The polarity of electrodes is periodically inverted. By way of example, the time interval during which the current flows in such a manner that the cylindrical outer electrode serves as the anode of the cell occupies 60 to 99.9% of a period of polarity inversion, and the time interval during which the current flows in an inverse direction occupies 1 to 30% of a period of polarity inversion. In other words, for 10 milliseconds to 1,000 minutes the current flows in such a manner that the cylindrical outer electrode serves as the anode of the cell and for 1 milliseconds to 10 minutes the current flows in an inverse direction. An oscillograph is used for checking to see that the polarity inversion is actually effectuated with this period.

The above-described polarity inversion has an effect of dissolving the compounds depositing on the surfaces of the electrodes. Since the time required for the deposition of these compounds depends on the kinds of metal ions contained in the pickling liquor to be treated, two time intervals, of which the above-described period is made up, are planned out according to the kinds of these metal ions. The above-described polarity inversion has another effect of preventing bubbles from growing on the surfaces of electrodes to such an extent that these bubbles form layers having a large insulation resistance. Thus a desired charging current density can be obtained. The flow of liquids along the surfaces of electrodes is not disturbed by friction drag which would be caused by large bubbles. Liquids are allowed to flow at a stable dynamic pressure and uniformly come in contact with the surfaces of electrodes and the ion exchange membranes so as not to vibrate the ion exchange membranes. Thus the spacing between one membrane and an electrode adjacent thereto and the spacing between the other membrance and an electrode adjacent thereto can be kept practically constant.

One of the problems to be solved by the present invention is how to make do with the limited capacity of a given power supply in furnishing an electrolyzer with a desired total charging current. This problem is solved by finding the value of n from the following expression, providing a plurality of electrolyzers such that the number of electrolyzers provided is equal to an integral number which is greater than and closest to the value of n, connecting these electrolyzers in series, and connecting the first and final electrolyzers to the given power supply:

$$n = \frac{c}{ab}$$

where
- a=charging current density obtainable from the given power supply
- b=area of one electrode surface opposed to the other within an electrolyzer
- c=total charging current intensity required for isolating ions from an electrolytic solution In order to minimize electrode resistance, it is necessary to narrow the spacings between one membrane and an electrode adjacent thereto, between the other membrane and an electrode adjacent thereto, and between two membranes. It is also necessary to effectuate the rapid flow of liquids through these spacings from bottom to top so that bubbles growing on the surfaces of electrodes may be discharged as promptly as possible. The anolyte and catholyte discharged from the anolyte and catholyte compartments are fed to reduced-pressure deaerators respectively, where extremely small bubbles are removed from the anolyte and catholyte so as to make them fit for being refed to the anolyte and catholyte compartments.

Reference will now again be specifically made to a plurality of electrolyzers connected in series, in which case a measure to counter the formation of layers having a large insulation resistance on the surfaces of electrodes in any one of these electrolyzers has a vital importance. If bubbles grow on the surfaces of electrodes in one of these electrolyzers to such an extent that these bubbles form layers having a lagre insulation resistance, the electrolytic current cannot flow not only through the electrolyzer involved but also through all the other electrolyzers in series cnnection.

It should be noted, however, that bubbles are only one instance among many factors which cause a change in electrode resistance and thereby make the operation of electrolyzers in series connection unstable. The specific electric conductivities of liquids to be fed into the above-described three spacings in each electrolyzer are another instance, which also must be kept constant in order to ensure the stable operation of electrolyzers in series connection. In order to check to see that the specific electric conductivities of the liquids will not fluctuate, the compositions of the liquids must be monitored by means of an analytical instrument disposed at the inlet to each of the above-described three spacings in each electrolyzer. Means for correcting the composition of each liquid must be provided by way of precaution against the occurrence of a change in the composition of each liquid.

In addition to a use as a means for treating a liquid used for the surface treatment of metal, the electrolyzer in accordance with the present invention has another use as a means for removing ionic impurities from various electrolyte solutions. For example, in one described embodiment, a cylindrical cation permeable membrane is disposed inside and in concentric spaced relation to the outer cylindrical anode so as to form an anolyte compartment between these outer elements. Because of this contruction, this embodiment is suited for removing cationic impurities from, e.g., the following acids:

(a) Metallic acids (such as chromic acid, molybdic acid and tungstic acid)

(b) Inorganic acids (such as sulfuric acid, hydrochloric acid, hydrofluoric acid, nitric acid and phosphoric acid)

(c) Organic acids (such as oxalic acid, citric acid and butyric acid)

A solution of one of these acids is fed to the electrolytic solution compartment located between the anolyte and catholyte compartments. Since the membrane disposed between the electrolytic solution compartment and the catholyte compartment is also a cation permeable membrane, the passage of an electric current between the anode and the cathode causes the cationic impurities present in the electrolytic solution to migrate from the electrolytic solution compartment into the catholyte compartment. On the other hand, the concentration of the acid radicals in the electrolytic solution is kept constant, because these acid radicals cannot migrate from the electrolytic solution compartment into the anolyte compartment.

DESCRIPTION OF PREFERRED EMBODIMENTS (EXAMPLE 1)

This Example deals with the case where rods, which met the requirements prescribed in SUS 304 of the Japanese Industrial Standard, were immersed in pickling liquor for the purpose of descaling. The pickling liquor comprised 0.8N (50.4 g/l) free nitric acid, 0.5N (10 g/l) free hydrofluoric acid and 0.5N (9.1 g/l) iron salt, and was held at 60° C.

This pickling liquor was contained in a pickling device having a capacity of 15 $m^3$. The concentration of iron salt in the pickling liquor increased as the descaling process proceeded. An analysis demonstrated that the rate of increase in the concentration was 101 electrochemical equivalent per hour. An electrolyzer was used for removing the metallic components accumulating in the pickling device.

Figure 1:
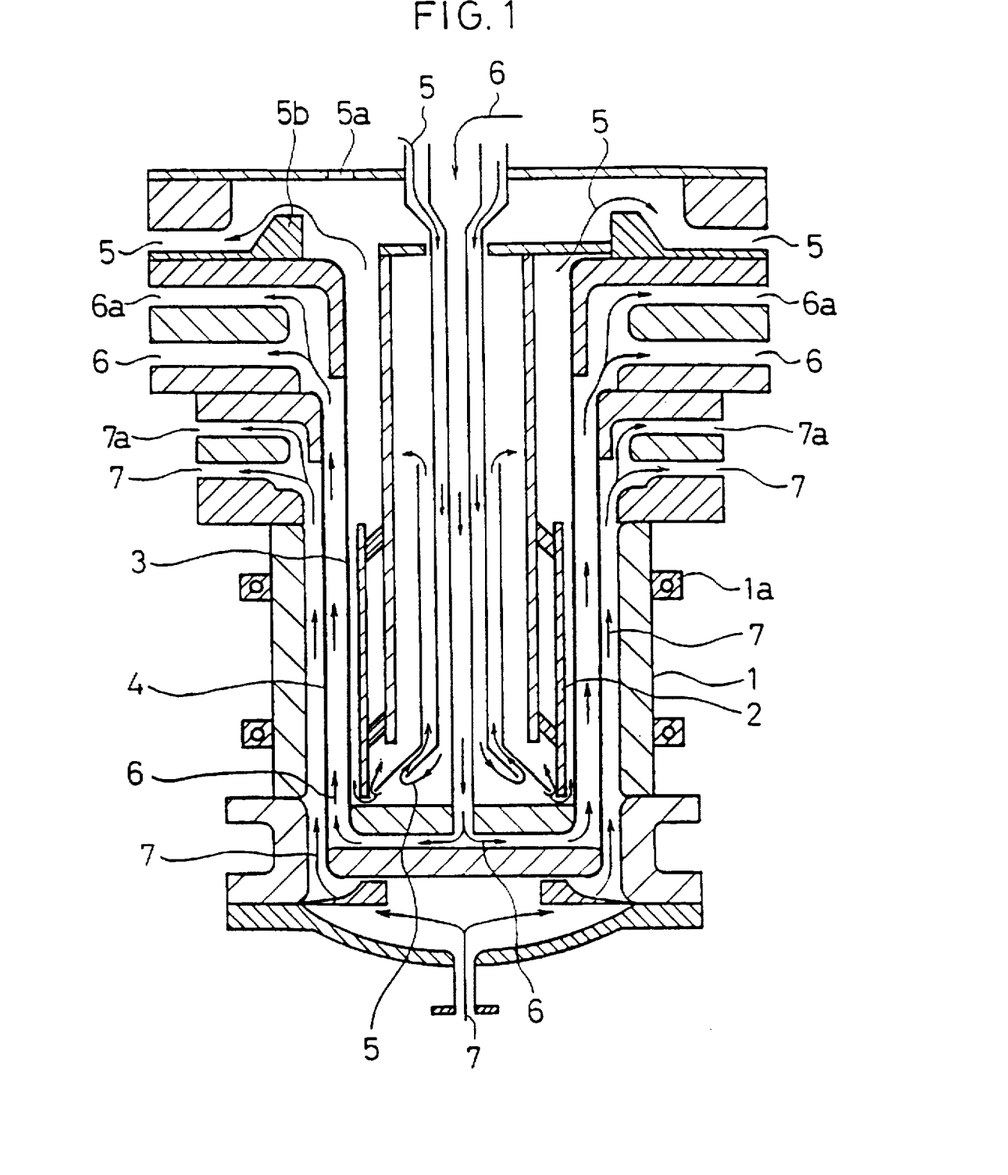
FIG. 1 is a longitudinal section of an advantageous embodiment of the electrolyzer in accordance with the present invention.

The construction of the electrolyzer used is shown in FIG. 1.

Referring now to FIG. 1, a cylindrical anode 1 is made of titanium having a thickness of 6 mm, an inside diameter of 1,000 mm and a length of 1,000 mm. The inner surface of the anode 1 is clad with platinum leaf having a thickness of 8 μm. This improves corrosion resistance to a significant degree. A cylindrical cathode 2 is disposed concentrically with respect to the anode 1 and spaced radially inwardly from the inner surface thereof. An inner cylindrical membrane 3 is disposed outside and in concentric spaced relation to the cathode 2 so as to form a catholyte compartment between these inner elements. An outer cylindrical membrane 4 is disposed inside and in concentric spaced relation to the anode 1 so as to form an anolyte compartment between these outer elements. The membranes 3 and 4 separate the two electrode compartments from a pickling liquor compartment located between said electrode compartments. The catholyte flowing through the catholyte compartment is discharged therefrom and returned to the uppermost part of the electrolyzer through a circulating line 5. Gases are removed from within the catholyte compartment through a gas vent port 5a. The pickling liquor flowing throuth the pickling liquor compartment is discharged therefrom and returned to the uppermost part of the electrolyzer through a circulating line 6. Gases are removed from within the pickling liquor compartment through gas vent ports 6a. The anolyte flowing through the anolyte compartment is discharged therefrom and returned to the lowermost part of the electrolyzer through a circulating line 7. Gases are removed from within the anolyte compartment through gas vent ports 7a.

Because of eight terminals 1a circumferentially spaced on the outer surface of the anode 1, electric charge to be carried by the anode 1 can be distributed as uniformly as possible on the surface of the anode 1 so that even the internal resistance of titanium, of which the anode 1 is made, may not cause the anode 1 to be locally overheated to such an extent that the platinum leaf applied to the inner surface of the anode 1 falls off.

At the end of 6-month operation to which the above-described electrolyzer was subjected with an electrolytic current density of 30 A/dm$^2$, the platinum leaf was found to be free of separation from the inner surface of the anode 1 due seemingly to the electric charge unevenly carried by the anode 1.

The cathode 2 has an outside diameter of 985 mm, a length of 1,000 mm and a thickness of 7 mm. A plurality of holes having a bore of 10 mm are uniformly distributed all over the surfaces of the cathode 2, with the rate of hole area approximated at 40%. Four conductive bars longitudinally extending within the cathode 2 are in a contoured tight engagement with the inner surface of the cathode 2. They are disposed in circumferentially equally spaced relation to each other so that charging current density may be dispersed as uniformly as possible on the surface of the cathode 2.

Accordingly, the spacing between the anode 1 and the cathode 2 is 15 mm. Two membranes 3 and 4 spaced from each other are disposed between these two electrodes 1 and 2 in spaced relation thereto.

The membranes 3 and 4 are made of oxidation- and heat-resisting ion-exchange resin having low electric resistance and containing a fibrous reinforcement. By way of example, the present inventors prefer to use membranes manufactured by DuPont and sold under the name "Nafion".

It is inconceivable that these membranes 3 and 4 are weak to the extent of being damaged by the force exerted thereon under normal working conditions. However, if pressure regulation for each compartment does not work out, fluctuations in the pressure heads of the liquids circulating through the electrolyzer will cause the flexible membranes 3 and 4 to bulge objectionably. When such bulging occurs, it prevents the volume of each compartment from being kept constant and makes it difficult to maintain a constant flow rate.

The present invention solves the aforesaid problem in a simple and efficient manner by introducing a liquid into the lower part of each compartment and then forcing the liquid upwardly. As for the discharge of the liquid, radially omnidirectional discharge is preferable to radially unidirectional discharge in order to discharge the liquid spontaneously, i.e. not forcibly, and yet uniformly from each compartment. A circular ridge 5b is provided at the upper end of the catholyte compartment for ease of radially omnidirectional discharge of the catholyte.

In order to prevent an increase in the internal pressure of the circulating lines, gases separated from the liquids are removed through gas vent ports 5a, 6a and 7a provided at the upper portion of the electrolyzer.

The anolyte ran at a speed of 0.1 m/sec through the anolyte compartment, and hence the flow rate of the anolyte flowing through the anolyte compartment was about 20 m$^3$/hr.

Figure 2:
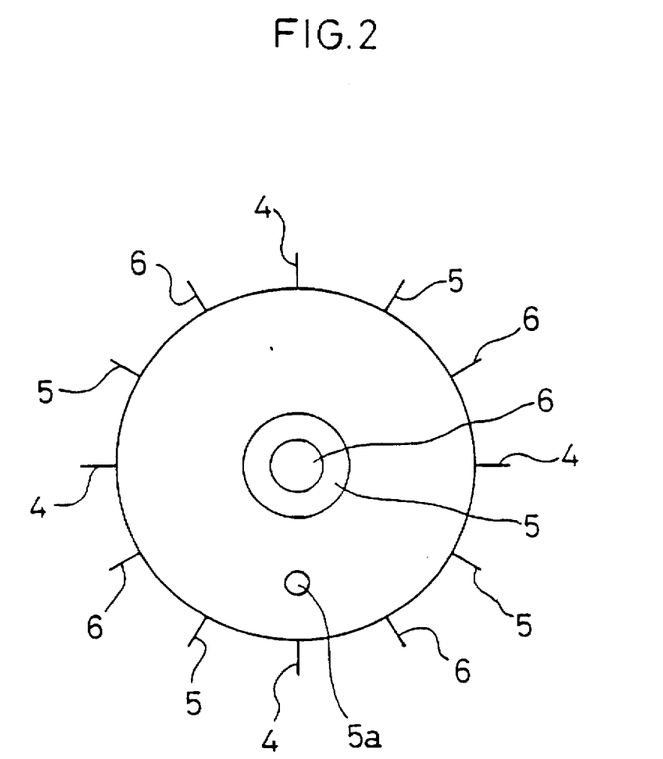
FIG. 2 is a schematic plan view of the electrolyzer of FIG. 1.

FIG. 2 helps explain how the distribution of liquids is effectuated at the discharge side of the electrolyzer.

The difference in height between the catholyte discharge ports and the anolyte discharge ports was about 15 cm. As shown in FIG. 1, separation of the gases from the liquids is accomplished by providing separate discharge ports for the gases and the liquids.

(EXAMPLE 2)

Figure 3:
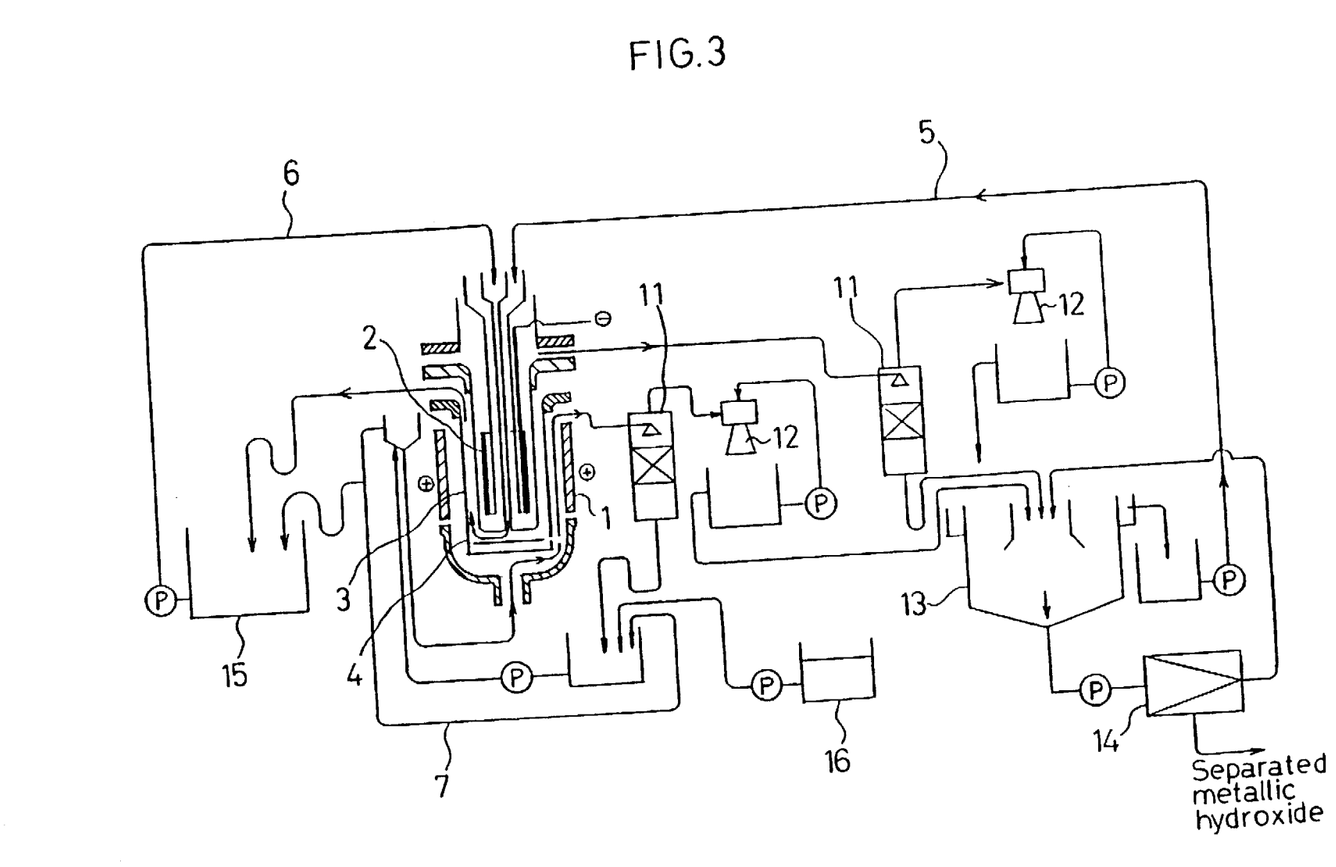
FIG. 3 is a schematic view of an arrangement employing an electolyzer of the present invention.
Figure 4:
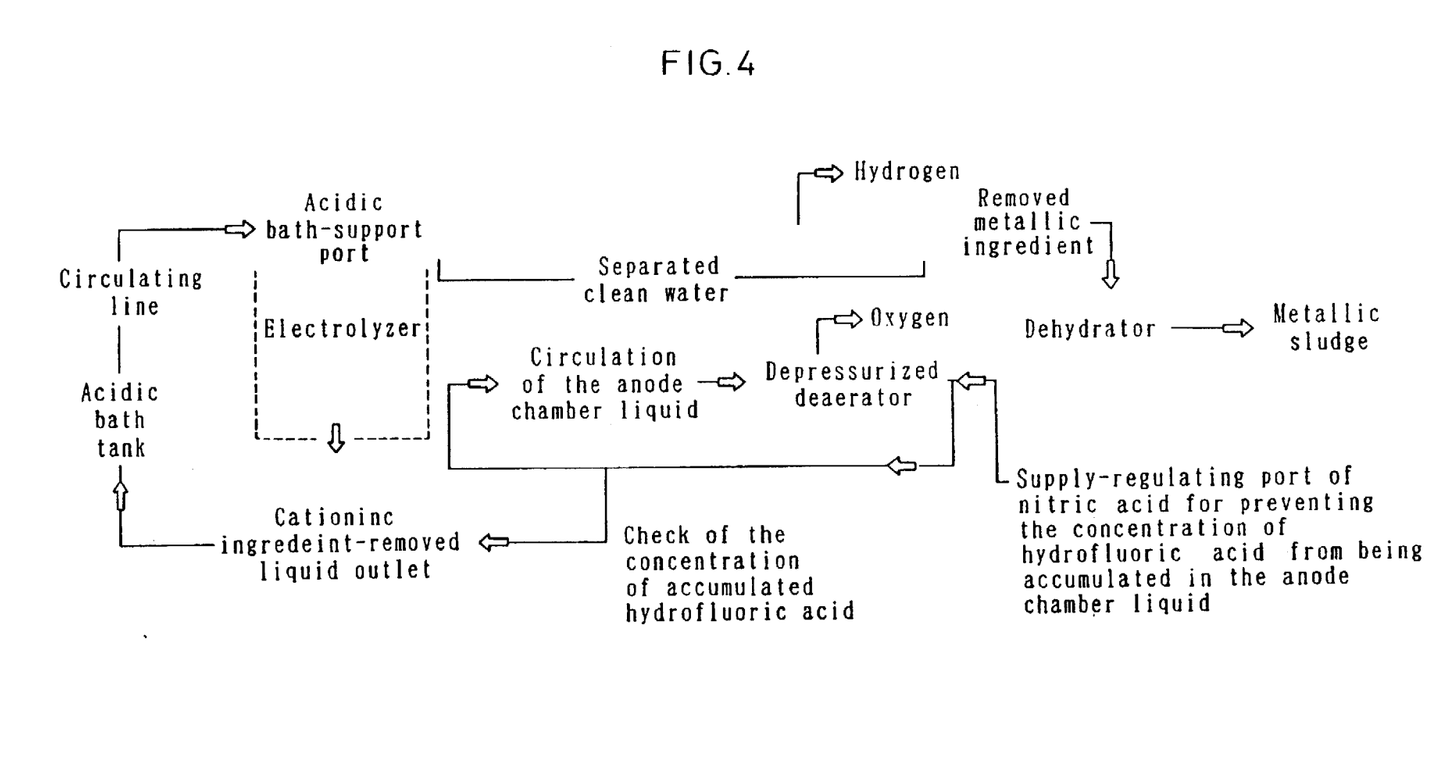
FIG. 4 is a schematic representation of the arrangement of FIG. 3.
Figure 5:
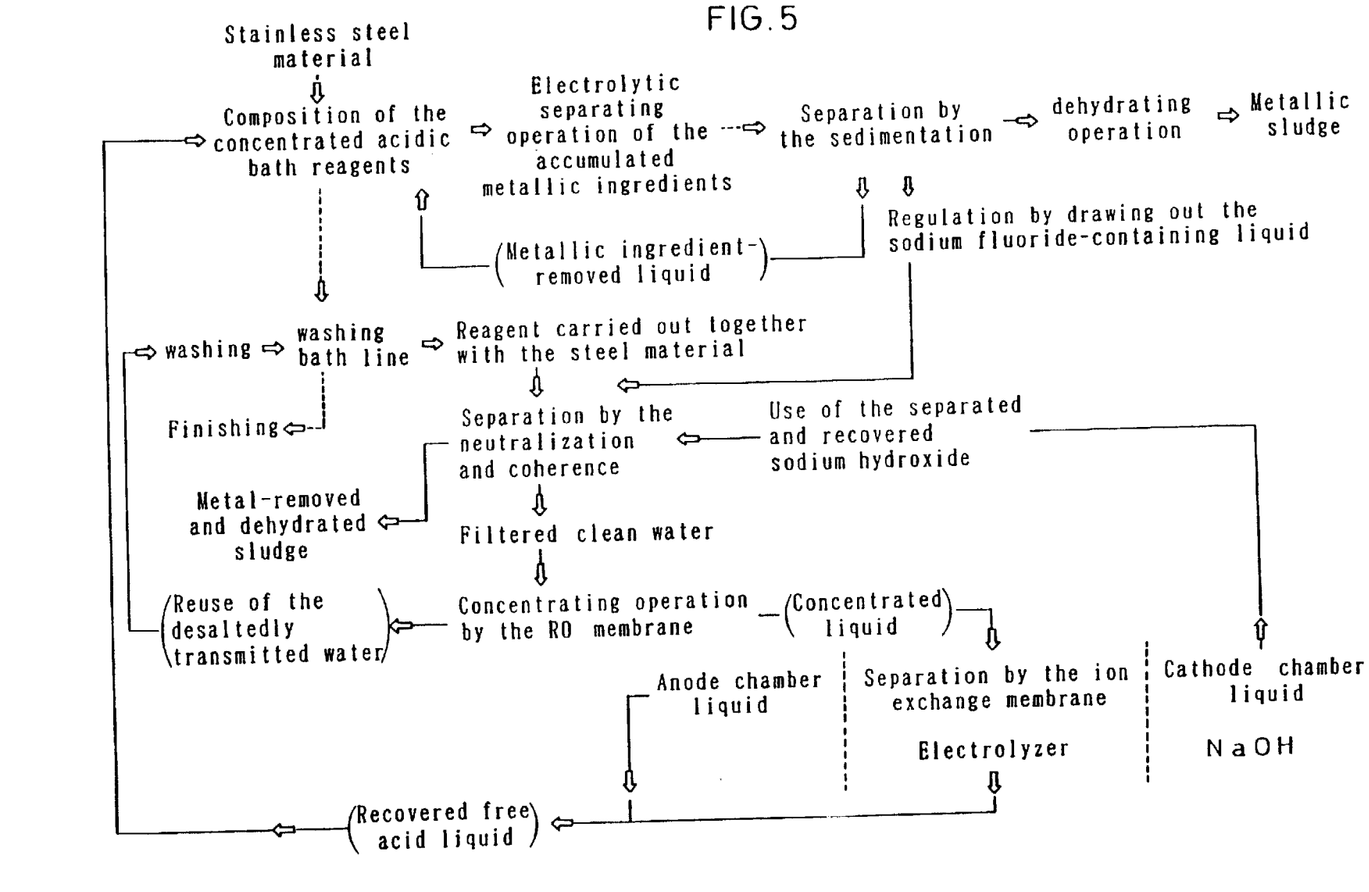
FIG. 5 is a flowchart showing the manner in which some components contained in the rinsing water are recovered.

FIG. 3 shows peripheral equipment used for the operation of the electrolyzer described in Example 1. FIG. 4 is a schematic representation of the arrangement of FIG. 3.

Since the anolyte and catholyte discharged from the anolyte and catholyte compartments contain extremely small bubbles generated on the surfaces of the electrodes, they are not fit for being subjected to circulation and refed to the anolyte and catholyte compartments. In order to make them fit for circulation, they were fed to reduced-pressure deaerators 11 respectively, where extremely small bubbles were removed from the anolyte and catholyte so that there might be no possibility of fluid resistance which would have been caused by these bubbles if they had not been removed from the anolyte and catholyte but had been stuck to the inner surfaces of the circulating pipes.

The removal of extremely small bubbles from the anolyte and catholyte was allowed to take place by the reduced internal pressure of the deaerators 11. The reduced internal pressure of each deaerator 11 resulted from entrainment caused by a jet of an alkaline liquid ejected by an ejector pump 12.

Metallic components were subjected to electrophoresis to the catholyte compartment, converted into metal hydroxides, allowed to flow through the catholyte circulating line 5, delivered to a sedimentation tank 13, and isolated from the catholyte so as to be separated from the circulating system.

Metal compounds isolated in the sedimentation tank 13 had a high filterability such that thick filter cakes, with which a furnace was ready to be charged, were obtained in a pneumatic dewatering bin 14 without the aid of any auxiliary means.

A pickling device 15 was disposed along the pickling liquor circulating line 6. The anolyte circulating line 7 was replenished with nitric acid from a make-up tank 16.

The polarity of the electrodes 1 and 2 was inverted. This had the effect of allowing gases to be generated in the form of extremely small bubbles less liable to stick to the surfaces of the membranes 3 and 4 so as to allow the liquids to be smoothly and continuously discharged from the electrolyzer.

During a span of 30 to 90 milliseconds, the current was allowed to flow in such a manner that the electrode 1 served as the anode of the cell. During a subsequent span of 10 to 40 milliseconds, the current was allowed to flow in an inverse direction.

The above-described polarity inversion hardly exerted an adverse influence upon the drift of ions and hardly caused concentration polarization.

(EXAMPLE 3)

The same electrolyzer and power supply as those used in Examples 1 and 2 were used. Table 1 reports the quantities of ions, in electrochemical equivalents per hour, which migrated into the catholyte compartment. It should be noted that cations were accompanied by hydrofluoric acid radicals and nitric acid radicals.

TABLE 1

| Time, hrs | 2 | 3 | 4 |
|---|---|---|---|
| Voltage, V | 3.0 | 2.8 | 2.8 |
| Current, kA | 8.37 | 8.37 | 8.37 |
| Fe | 85 | 87 | 86 |
| Ni | 10 | 10 | 11 |
| Cr | 6 | 7 | 8 |
| Ca | 0.01 | 0.02 | 0.01 |
| Total cations (a), eq/hr | 101 | 104 | 105 |
| F | 43 | 45 | 42 |
| NO$_3$ | 1.2 | 1.0 | 1.2 |
| Total anions (b), eq/hr | 44.2 | 46.0 | 43.2 |
| (b)/(a) | 0.437 | 0.442 | 0.411 |

Since nitric acid radicals are a relatively expensive agent, they are worth being recovered for the purpose of recycling them as nitric acid in the pickling liquor.

A large quantity of hydrofluoric acid radicals were found to be contained in the supernatant liquid of the catholyte and increasing at a high rate such that the equivalent ratio of iron to hydrofluoric acid radicals was 1:0.53 in terms of chemical equivalents.

Although iron can be isolated in the form of a deposit, hydrofluoric acid radicals are accumulated in the form of a soluble salt, i.e. in the form of sodium fluoride, the solubility of which is low to such an extent that the amount of sodium fluoride in the catholyte compartment exceeds its solubility in a short time and that the sodium fluoride in excess of its solubility accumulates in the catholyte compartment in the form of a precipitate.

The accumulating precipitate must be continuously removed from the catholyte compartment and subjected to electrolysis again so that hydrofluoric acid and nitric acid may be recovered.

The membranes 3 and 4 were found to stand long use and undergo no change in electric resistance and permeability to cations.

(EXAMPLE 4)

This Example deals with a method of and an apparatus for recovering reusable components from a first liquid and a second liquid, the definitions of these two liquids being given hereinafter. When pickling liquor containing a fluoride or fluorides is treated by the electrolzer, fluoric ions in coordination bond with iron ions inevitably move into the cathode compartment, wherein the equivalent ratio of iron ions to fluoric ions is known to be 1:0.4 to 1:0.6 in terms of electrochemical equivalent. In the cathode compartment, these fluoric ions act upon alkaline components existing in the cathode compartment and are converted into soluble sodium fluoride, which is accumulated in the cathode compartment to such an extent that the concentration of the sodium fluoride in the liquid in the cathode compartment exceeds the solubility. The result is that a tacky precipitate forms, which soon collects on the ion exchange membrane defining the cathode compartment and causes a decline in the electrical conductivity of the ion exchange membrane to such an extent that supply voltage has to be increased in order to continue the electrolysis at constant current. Consequently a difficulty is encountered in trying to allow a process of stable and effective electrolysis to extend over a long period of time. In order to overcome this difficulty, the catholyte containing sodium fluoride in high concentrations (hereinafter referred to as "the first liquid") has to be continuously drawn out of the catholyte compartment.

It is proposed by the present inventors to recover reusable components from the first liquid, while it is most common to discard the first liquid as soon as it is drawn out of the catholyte compartment.

What the present invertors call "the second liquid" is rinsing water used for rinsing the surfaces of steel subsequently to the immersion of the steel in pickling liquor and then neutralized. The present invertors have found that, when sodium hydroxide or potassium hydroxide is used for the neutralization of the rinsing water containing the pickling liquor, fluoric ions which are in coexistence with metal ions in the rinsing water can be isolated in the form of a soluble salt, i.e. in the form of sodium fluoride or potassium fluoride, and a metallic compound which does not contain a halogen can be obtained.

The concentration of the above-mentioned soluble salt in the neutralized rinsing water is low to such an extent that, unless the rinsing water is enriched before everything, a trial of recycling this soluble salt is not considered to come off well.

In case of Example 4, the above-mentioned metallic compound took the form of iron, which was isolated from the second liquid as a sediment. Then the second liquid was filtered so that iron particulates dispersed therein might be removed therefrom. Then the filtrate was fed to a reverse osmosis equipment in which the reverse osmotic pressure was held at 15 Kg/cm$^2$, and demineralized water having a Svedverg unit of 25 μS was obtained. This water was recycled as rinsing water.

The second liquid, which was enriched as a result of passage through the reverse osmosis equipment, contained sodium fluoride and sodium nitrate. Now the first and second liquids were fed to a second electrolyzer.

An outer cylindrical membrane 4 defining the anolyte compartment of the second electrolyzer is a composite cation permeable membrane, while an inner cylindrical membrane 3 defining the catholyte compartment of the second electrolyzer is a cation permeable membrane. The first and second liquids are fed to an electrolytic solution compartment located between said electrode compartments. The cylindrical electrodes of the second electrolyzer are made of the same materials as those of the first electrolyzer. Acids can be recovered in the same manner as mentioned in reference to the first electrolyzer.

The difference between the first and second electrolyzers resides in the fact that the membrane 4 defining the anolyte compartment of the first electrolyzer is an anion permeable membrane. Overt improvement in the degree of dissociation of neutral salts is accomplished by the second electrolyzer.

Table 2 illustrates the conditions of the anolyte compartment (c), inlet (d) to the electrolytic solution compartmet, outlet (e) from the electrolytic solution compartment, and catholyte compartment (f) of the second electrolyzer during the above-described mode of operation of the two electrolyzers.

TABLE 2

| Time (hrs) | (c) HNO$_3$ | (c) HF | (d) NaF | (d) NaNO$_3$ | (e) NF | (e) HNO$_3$ | (e) NaF | (e) NaNO$_3$ | (f) NaOH | (f) NaF | (f) NaNO$_3$ |
|---|---|---|---|---|---|---|---|---|---|---|---|
| 0 | 2.0N | <.001 | 2.0N | 0.8N | 1.5 | 0.7 | 0.4 | 0.1 | 2.5 | <0.01N | <0.001 |
| 10 | 2.2N | <.01 | 1.4 | 0.7 | 1.2 | 0.6 | 0.2 | 0.1 | 3.6 | 0.02 | <0.001 |
| 20 | 2.2 | <.01 | 2.0 | 0.8 | 1.7 | 0.7 | 0.2 | 0.1 | 3.5 | 0.02 | <0.001 |

Free acids recovered from the anolyte compartment (c) was returned to the pickling device 15. The alkaline liquid recovered from the catholyte compartment (f) was recycled as an alkaline agent for neutralizing the rinsing water. Thus, most of the chemicals used in the pickling device 15 were recovered. The expensive alkaline agent, which is an indispensable thing to the neutralization of the rinsing water, could also be recycled. The metallic compound recovered from the rinsing water did not contain a halogen. The above-described process of recovering the metal does not necessitate the purchase of an inorganic coagulant but minimizes the possibility of industrial pollution.

(EXAMPLE 5)

It was found that a current carrying capacity of about 9,000 A/hr would be required if, under the condition that iron was increasing at the rate of 150 eq/hr, the same electrolyzer as that used in Examples 1 to 3 was singly used for recovering iron pickling liquor containing 31 g/l of $HNO_3$ and 10 g/l of $Fe(NO_3)_3$. It was further found that, in order to meet the need of the above-mentioned current carrying capacity under the condition that a charging current density of 30 A/dm$^2$ was available, the area of one electrode surface opposed to the other would have to be about 300 dm$^2$. The need of this area will be met by a cylindrical anode 1 having a diameter of 950 mm and a length of 1,000 mm. As for electrolytic voltage, about 5.6 V are actually required, although theoretically required electrolytic voltage is no more than about 3.5 V. The reason for the actual requirement of about 5.6 V is that there are some factors, such as bubble formation, involved in making the stabilization of electrolytic voltage difficult during the continuous running. Consequently it was concluded that 54 kW would be necessary as the capacity of a power supply.

Therefore, the idea of recovering iron from the above-described pickling liquor by means of a single electrolyzer was given up. The embodiment shown in FIG. 6 had four electrolyzers connected in series, each of which had a current carrying capacity of 2355 A/hr and included a cylindrical anode having a diameter of 500 mm and a length of 500 mm. The area of one electrode surface opposed to the other was 78.5 dm$^2$. The positive terminal of a power supply was connected to the anode of the first electrolyzer. The cathode of one electrolyzer was connected to the anode of the following electrolyzer. The cathode of the fourth electrolyzer was connected to the negative terminal of the power supply.

Figure 6:
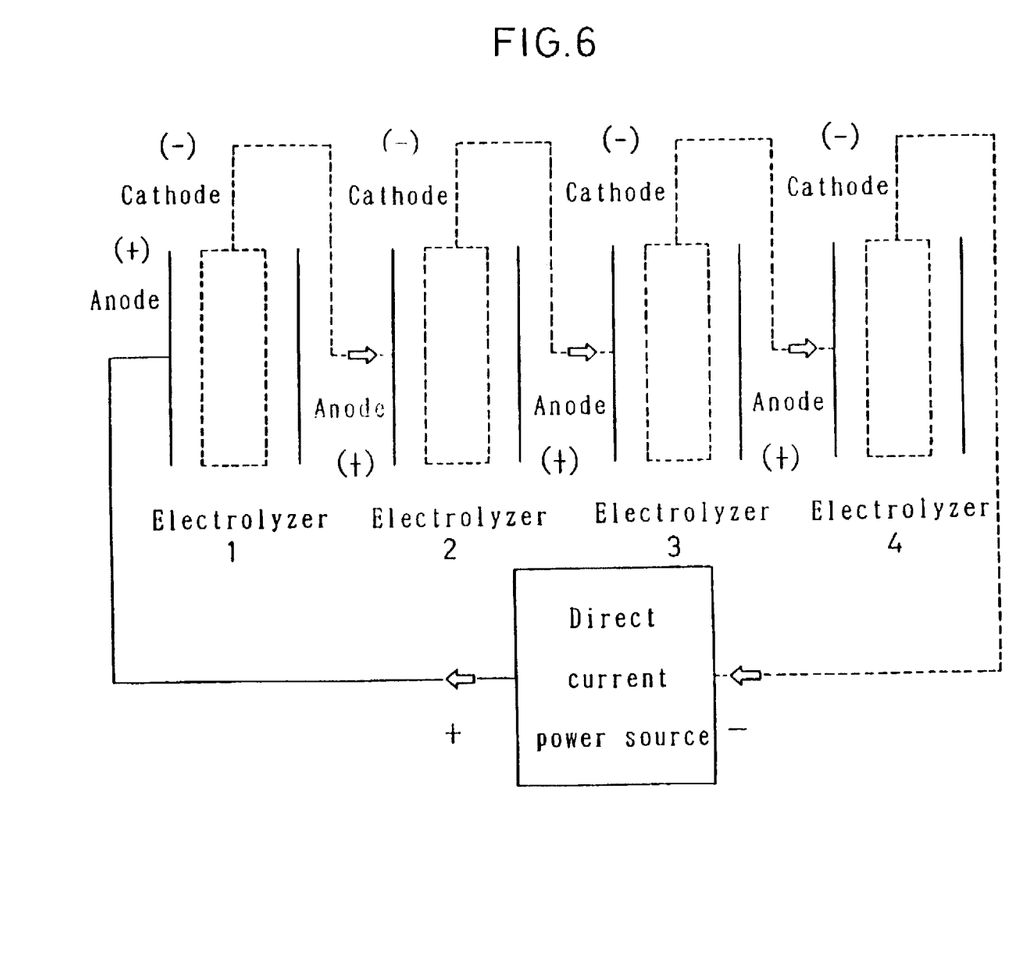
FIG. 6 is a schematic view of another arrangement employing a plurality of electrolyzers of the present invention.

An electrolytic solution was held at 60° C. and pumped from a fountain through four feed lines disposed in spaced parallel relation with each other so that the four electrolyzers might be simultaneously fed with the same electrolytic solution. The catholyte circulating lines 5 and the anolyte circulating lines 7 of the four electrolyzers also had auxiliary facilities in common. An electrolytic current of 2,300 A was to be allowed to flow. It was presumed that about 2.5 V would be required for each electrolyzer. After turning on the electrolytic current, however, it was found that about 6 V were required for keeping the electrolytic current at 2,300 A. This means that the capacity of the power supply had only to be 13.5 kW.

During the running of the electrolyzers, the electrolytic current hardly underwent variation. Only slight variation was caused by the fluctuations of the specific electric conductivities of liquids flowing through the compartments of each electrolyzer, which fluctuations in turn were caused by the fluctuations of the compositions of these liquids. The sharp fluctuations of current in a short time or the interruption of current did not occur. The stable behavior of the electrolytic current was reflected in the measured values of the compositions of liquids.

Thus, as compared with a single electrolyzer, four electrolyzers connected in series permitted the reduction of the power consumption as well as the capacity of a power supply to a quarter.

(EXAMPLE 6)

This Example deals with the utilization of gases removed from within the catholyte, pickling liquor and anolyte compartments through gas vent ports 5a, 6a and 7a. In addition to the fact that the removal of gases from these compartments has the effect of enriching the liquids to the extent of improving the current efficiency, hydrogen removed from within the catholyte compartment can be allowed to act upon oxygen so that water may be formed. This water can be returned to the electrolyzer so as to prevent the liquids from being excessively enriched. For the purpose of the formation of water, the hydrogen is allowed to pass through a laminate of granular active carbon.

(EXAMPLE 7)

As mentioned in reference to Example 4, a decline in the specific electric conductivity of a liquid flowing through any one of the compartments of an electrolyzer will result in an increase in the electricity rates to be borne, because supply voltage has to be increased in order to continue the electrolysis at constant currnet. Especially, since the above-described four electrolyzers connected in series are characterized in low power consumption and low capacity of a power supply, these four electroyzers require that the compostions of the liquids should be monitored in order to check to see that they are free of fluctuations, to say nothing of the requirement that bubbles should be prevented from growing on the surfaces of electrodes to such an extent that these bubbles form layers having a large insulation resistance.

Figure 7:
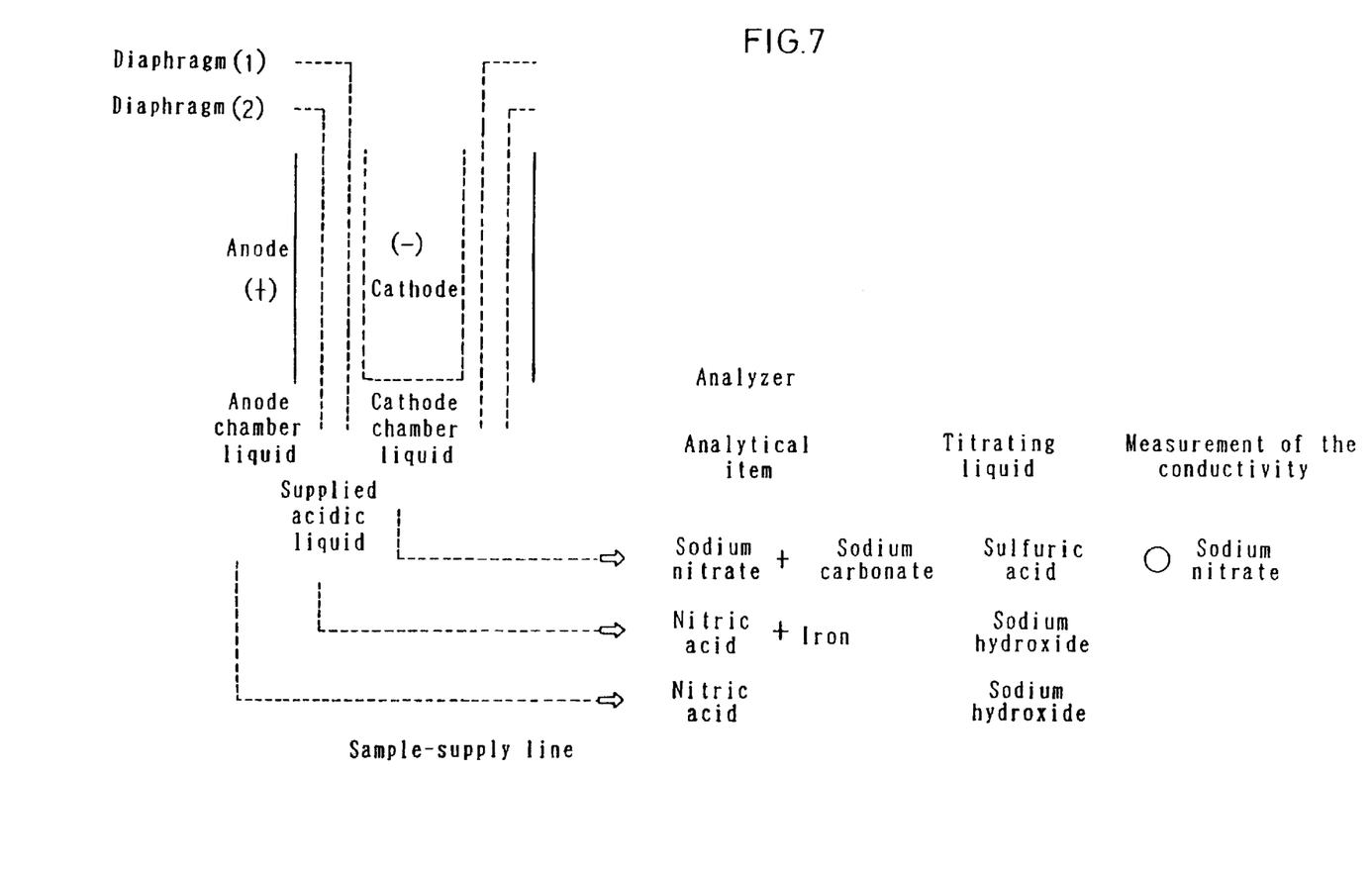
FIG. 7 is a schematic representation showing the manner in which the compositions of the liquids are monitored by means of analytical instruments.

The electrolyzer shown in FIG. 7 has three sample-taking holes formed at the inlets to three compartments respectively. Samples are periodically taken from these sample-taking holes one by one and fed to an analytical instrument. Information, which is of use in keeping the compositions of the liquids constant, is obtained from the analytical instrument. A conductance cell may be used concomitantly. Preferably, the analytical instrument is of the kind provided with means for simultaneously obtaining all the information about rich acidic, alkaline and metallic components, wherein all one has to do for obtaining such information is to vary the titrant according to the purpose. Sodium hydroxide is a suitable titrant for the quantitative analysis of acidic and metallic components, while sulfuric acid is a suitable titrant for the quantitative analysis of sodium carbonate. The conductance cell is suitable for the quantitative analysis of sodium nitrate.

In this Example, samples were taken from the anolyte and catholyte. The anolyte contained about two gram equivalent weight of nitric acid (g) in one liter of solution, while the catholyte was a mixed solution consisting of a solution which contained about 0.5 gram equivalent weight of sodium carbonate (h) in one liter of solution and a solution which contained two gram equivalent weight of sodium nitrate (i) in one liter of solution. The samples were subjected to a thermometric titration and a conductometric titration. The concentrations of (g), (h) and (i) in the solutions, as determined by these titrations, are shown in Table 3, together with the concentrations of a free acid (j) and iron (k) which migrated into the catholyte compartment.

TABLE 3

| Time  | (g)  | (j)  | (k)  | (h)  | (i)  |
|-------|------|------|------|------|------|
| 0 hr  | 2.1N | 0.5N | 0.5N | 0.5N | 1.0N |
| 10 hr | 2.3  | 0.55 | 0.45 | 0.45 | 1.0  |
| 20 hr | 2.1  | 0.6  | 0.40 | 0.48 | 1.1  |
| 30 hr | 2.3  | 0.5  | 0.5  | 0.50 | 1.0  |
| 40 hr | 2.1  | 0.6  | 0.4  | 0.55 | 1.2  |

Samples were taken also from the pickling liquor at the inlet to the pickling liquor compartment. The fact that the concentration of iron in the pickling liquor was not found to be increasing was positive proof of the effective removal of iron from the pickling liquor.

We claim:

1. A method for operating an electrolyzer for treating an object liquid, said electrolyzer comprising:

a cylindrical anode formed as an outer wall and having an inner surface comprising a corrosion-resistant metal;

a cylindrical cathode coaxially arranged at a position close to said inner surface of said anode;

a plurality of ion exchange membranes coaxially arranged between said anode and cathode standing oppositely for functioning as electrically conductive partition diaphragms to control selection of ions electrophoretically passing therethrough;

said anode and one of said membranes forming an anode chamber, said cathode electrode and another one of said membranes forming a cathode chamber, and isolating chamber means defined by any two of said ion exchange membranes for selectively electrophoretically separating and removing and concentrating said ions;

circumferential passage means in flow communication with said isolating chamber for uniformly discharging said object liquid from said isolating chamber means after said object liquid has been subjected to treatment in said isolating chamber means; said method comprising:

applying to the anode a polarity which is periodically and repeatedly inverted so that a percentage of time during which the anode electrode plate is anodic relative to the cathode electrode plate is 60 to 99.9 percent, while a percentage of time during which the anode electrode plate is cathodic relative to the cathode electrode plate is 0.1 to 40 percent, and said time during which the anode electrode plate is anodic relative to the cathode electrode plate is 10 ms (milliseconds) to 1,000 min (minutes), while said time during which the anode electrode plate is cathodic relative to the cathode electrode plate is 1 ms (millisecond) to 10 min (minutes);

monitoring a wave form of a voltage applied during the respective polarities from a power source having a function capable of changing the respective times being used;

flowing a first liquid into said cathode chamber and flowing a second liquid into said anode chamber; and flowing said second liquid out of said anode chamber and flowing said first liquid out of said cathode chamber, respectively, into said passage means;

whereby very small bubbles generated all over surfaces of said cathode and anode are discharged by each of said first and second liquids, and sedimentation of different kinds of substances onto surfaces of said anode and cathode is suppressed.

2. A method of operating an electrolyzer as set forth in claim 1 for treatment of said object liquid wherein said object liquid comprises transition metal cations, halogen compounds, and sodium or potassium containing alkaline agents being added to said object liquid, said halogen compounds forming halogen ions accompanied by metallic ions which are electrophoretically moved into said cathode chamber, whereby soluble halides are formed from said halogen compounds and insoluble metal compounds are formed from said metallic ions, separating said soluble halides from said insoluble metal compounds, essentially continuously removing said first liquid containing said separated soluble halides from said electrolyzer, and analyzing said first liquid to maintain a concentration of said halides in said cathode chamber of said electrolyzer at a saturated concentration or less.

3. A method of operating an electrolyzer as set forth in claim 2 wherein said object liquid comprising said halogen compounds is isolated from said anode chamber by said ion exchange membranes, and said second liquid is selected to protect the inner surface of said anode electrode plate from corrosion by halogen ions diffusedly moved into said anode chamber.

4. A method of operating an electrolyzer as set forth in claim 3 wherein said object liquid is obtained from washings discharged from an operating line of a pickling tank in equipment for surface treatment of steel materials in an acid bath, wherein said object liquid comprises a mixture of nitric acid and hydrofluoric acid, said nitric acid is replenished to said acid bath for metal treatment and is supplied from said anode chamber to said acid bath, said quantity supplied to said acid bath being selected to maintain a concentration of halogen ions at 500 milligrams per liter or less in said acid bath.

5. A method of operating an electrolyzer as set forth in claim 2 wherein said object liquid is obtained from washings discharged from an operating line of a pickling tank in equipment for surface treatment of steel materials in an acid bath, wherein a concentrated liquid of said soluble halides is added to said second liquid continuously taken out of said cathode chamber and then the resulting mixed liquids are supplied to another electrolyzer, where cations are diffused into a cathode chamber of said other electrolyzer, and remaining anions are recovered in the form of free acids, sodium ions or potassium ions, which have been electrophoretically moved into the cathode chamber of said other electrolyzer, whereby sodium hydroxide or potassium hydroxide are formed, and an alkaline agent composed of said sodium hydroxide or potassium hydroxide is recovered for use as a neutralizing agent for said washings.

6. A method for operating a plurality of electrolyzers for treating an object liquid comprising a target substance, said electrolyzer comprising:

a cylindrical anode formed as an outer wall and having an inner surface;

a cylindrical cathode coaxially arranged at a position close to said inner surface of said anode;

a single or a plurality of ion exchange membranes coaxially arranged between said anode and cathode standing oppositely for functioning as electrically conductive partition diaphragms to control selection of ions electrophoretically passing therethrough;

isolating chamber means composed of said cylindrical anode, said cylindrical cathode and said single or plurality of ion exchange membranes for selectively electrophoretically separating and removing and concentrating said ions;

circumferential passage means in flow communication with said isolating chamber for uniformly discharging said object liquid from said isolating chamber means after said object liquid has been subjected to treatment in said isolating chamber means; said method comprising:

using said plurality of said electrolyzers, the number of said electrolyzers constituting said plurality being determined by: supplying an electric current to an electrode surface of a selected one of said electrolyzers and passing said electric current through said selected electrolyzer; determining a quantity of electricity required for said selected electrolyzer;

determining a quantity of electricity per unit time required for electrophoretically separating the target substance divided by said quantity of electricity required for said selected electrolyzer; determining a number of said electrolyzers required; and arranging the required number of said electrolyzers in series, with cathode terminals and anode terminals of respective said electrolyzers being alternately connected in series, and said terminals on both final ends being connected with an electrical power source.

7. A method of operating electrolyzers as set forth in claim 6, wherein an oxygen gas and a hydrogen gas are formed by electrolysis of water molecules during electrolytic reactions at said cathode and anode electrodes, and wherein said gases are introduced into an oxidizing catalyzer for conversion into water, or said gases are released into the atmosphere.

8. A method of operating electrolyzers as set forth in claim 7, wherein concentrations of the target substances and compositions of the respective liquids are simultaneously analyzed by analytical control means provided in a liquid-supply line supplying at least one of said electrolyzers to monitor operating conditions of said electrolyzer.

9. A method of operating electrolyzers as set forth in claim 6, wherein concentrations of the target substances and compositions of the respective liquids are simultaneously analyzed by analytical control means provided in a liquid-supply line supplying said electrolyzer to monitor operating conditions of said electrolyzer.

* * * * *